(No Model.)
L. B. ROWLEY.
ELECTRIC HEATER.
No. 517,170. Patented Mar. 27, 1894.
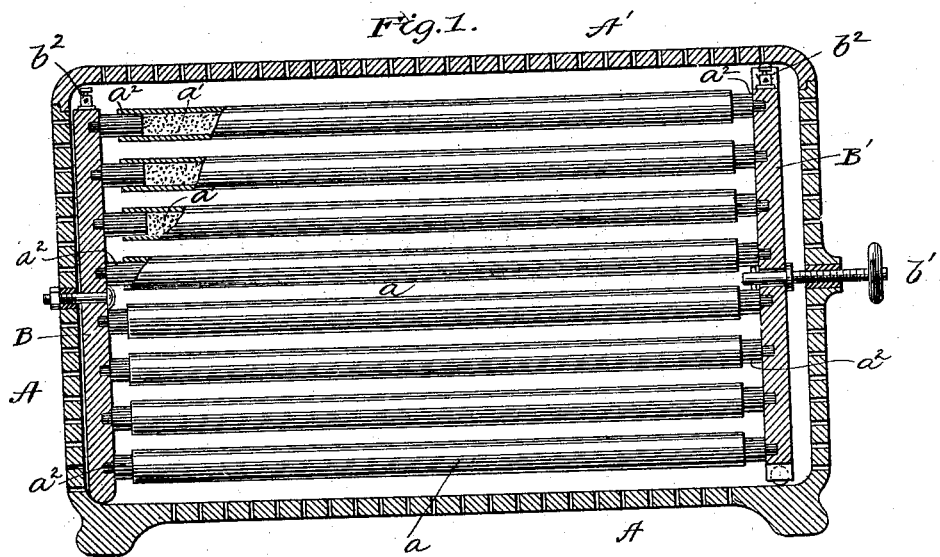
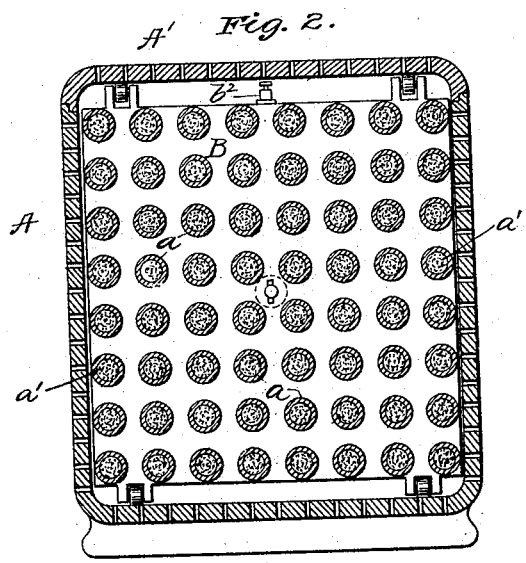
WITNESSES:
Frank S. Ober.
W. A. Opperman.
INVENTOR
Leslie B. Rowley
BY
ATTORNEY
THE NATIONAL LITHOGRAPHING COMPANY,
WASHINGTON, D. C.

UNITED STATES PATENT OFFICE.

LESLIE BROOKS ROWLEY, OF ASHLAND, WISCONSIN.

ELECTRIC HEATER.

SPECIFICATION forming part of Letters Patent No. 517,170, dated March 27, 1894.

Application filed January 28, 1893. Serial No. 459,994. (No model.)

*To all whom it may concern:*

Be it known that I, LESLIE BROOKS ROWLEY, a citizen of the United States, residing at Ashland, in the county of Ashland and State of Wisconsin, have invented certain new and useful Improvements in Electric Heaters, of which the following is a full, clear, and exact description.

My invention relates to electric heaters, the object being to produce a heater which shall be cheap of construction, efficient in operation, and of great durability.

The invention consists of the construction hereinafter described and particularly pointed out in the claim.

In the accompanying drawings, Figure 1 represents a vertical, longitudinal section of my improved heater; and Fig. 2 represents a vertical, transverse section of the same.

The heating apparatus is located in a box A. This box is preferably made of terra cotta, although it may be constructed of any other suitable material. If it is constructed of material which is an electrical conductor, the interior should be partially or wholly lined with a sheathing of insulating material, such as asbestos. The box is provided with a cover A', and all of its walls are perforated as shown, to permit of a circulation of air through the box.

The heating apparatus itself consists of a gang or plurality of tubes $a, a$, which are preferably made of terra cotta, although they may be made of pressed asbestos, or any other material which is a non-conductor of electricity and is refractory to heat. These tubes are mounted parallel to each other, but are separated so that air may pass freely between them. Inside of the tubes I place granulated graphite, or other carbon or electrical conductor in a finely divided state, represented by $a'$. In the ends of the tubes I place carbon plugs $a^2$, which make contact with the granulated material and project slightly from the ends of the tubes. These plugs on their outer ends are formed with pins or teats which enter correspondingly shaped sockets in a pair of supporting plates B, B'. These plates are of metal and serve to support the tubes. If desired, the plates may be provided with pins which enter cavities in the plugs; this would simply be the reverse of the construction shown and is an obvious equivalent. The plate B is made adjustable with respect to the plate B'; it is mounted on rollers which bear against the top and bottom of the box, and by means of a screw $b'$, which works in a wall of the box, it may be moved to a slight extent toward and away from the plate B'. The plates are provided with binding posts $b^2$, to which electrical conductors may be connected. When the circuit is completed, the current passes through the end plates and is distributed through the granulated conductor in the tubes $a, a$. This conductor, which is an electrical resistance, becomes heated and imparts its temperature to the tubes, which in turn heat the air passing through the box. The temperature may be regulated by adjusting the plate B, thus varying the conductivity of the granulated conductor.

It is to be understood that although I have illustrated round tubes, they may also be made square, or of any other cross section. When any of the tubes become burned out or otherwise destroyed, they may easily be replaced with new ones by separating the end plates and making the proper adjustments.

Having thus described my invention, I claim—

An electric heater consisting of a gang or plurality of tubes of non-conducting material, electrical resistances in said tubes, plugs closing the ends of said tubes and in contact with said resistances, and two metallic plates, one located at each end of the tubes and in contact with all the plugs, one of said plates being mounted upon rollers and provided with means whereby it may be moved for the purpose of varying the resistance of the material within the tube.

In testimony whereof I subscribe my signature in presence of two witnesses.

LESLIE BROOKS ROWLEY.

Witnesses:
W. A. OPPERMAN,
C. F. LATIMER.